United States Patent
Moore

[11] Patent Number: 6,026,888
[45] Date of Patent: *Feb. 22, 2000

[54] MOLDED HEAT EXCHANGER STRUCTURE FOR PORTABLE COMPUTER

[75] Inventor: David A. Moore, Tomball, Tex.

[73] Assignee: Compaq Computer Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/867,832

[22] Filed: Jun. 2, 1997

[51] Int. Cl.⁷ ...................................................... F28F 7/00
[52] U.S. Cl. ..................................... 165/80.3; 165/104.33; 165/185; 257/715; 257/796; 361/687; 361/700; 361/709; 361/710
[58] Field of Search ............................... 165/104.33, 80.3, 165/104.26, 905, 133, 46, 185; 361/700, 704, 705, 706, 707, 687, 709, 710, 715; 257/796; 209/49

[56] References Cited

U.S. PATENT DOCUMENTS

| | | | |
|---|---|---|---|
| 3,750,745 | 8/1973 | Moore, Jr. ............................ | 165/133 X |
| 4,838,346 | 6/1989 | Camarda et al. .................... | 165/133 X |
| 5,409,055 | 4/1995 | Tanaka et al. ...................... | 165/104.33 |
| 5,621,613 | 4/1997 | Haley et al. ........................ | 165/104.33 X |
| 5,642,776 | 7/1997 | Meyer, IV et al. ................... | 165/46 X |
| 5,661,637 | 8/1997 | Villaume .......................... | 165/104.33 X |
| 5,697,428 | 12/1997 | Akachi ............................. | 361/700 X |
| 5,712,762 | 1/1998 | Webb .............................. | 165/104.33 X |
| 5,718,282 | 2/1998 | Bhatia et al. ..................... | 165/104.33 X |
| 5,720,339 | 2/1998 | Glass et al. ....................... | 165/104.26 |
| 5,757,615 | 5/1998 | Donahoe et al. .................. | 165/104.33 X |
| 5,764,482 | 6/1998 | Meyer, IV et al. ................. | 361/704 X |
| 5,764,483 | 6/1998 | Ohashi et al. ..................... | 165/104.33 X |

*Primary Examiner*—Christopher Atkinson
*Attorney, Agent, or Firm*—Konneker & Smith, P.C.

[57] ABSTRACT

In a portable notebook computer a specially designed heat pipe-based heat exchanger assembly is used to efficiently dissipate heat from a processor board in the computer's base housing to ambient air surrounding the computer. The heat exchanger assembly includes a graphite fiber-filled outer heat exchanger body which includes a finned first portion that is exposed to the exterior of the base housing, and a second portion disposed within the base housing and thermally coupled to the processor board. The outer heat exchanger body is directly overmolded onto a thermosyphoning heat pipe having first and second longitudinal portions respectively encapsulated within the first and second outer heat exchanger portions. During computer operation, processor heat is conducted to the second heat pipe portions and is transmitted via the balance of the heat pipe to the finned outer heat exchanger portion for dissipation to ambient. The exposed fin edges of the first outer heat exchanger may have a layer of lower thermal conductivity plastic material suitably placed thereon to serve as a touch guard structure for the exposed portion of the heat exchanger structure.

10 Claims, 1 Drawing Sheet

U.S. Patent          Feb. 22, 2000          6,026,888
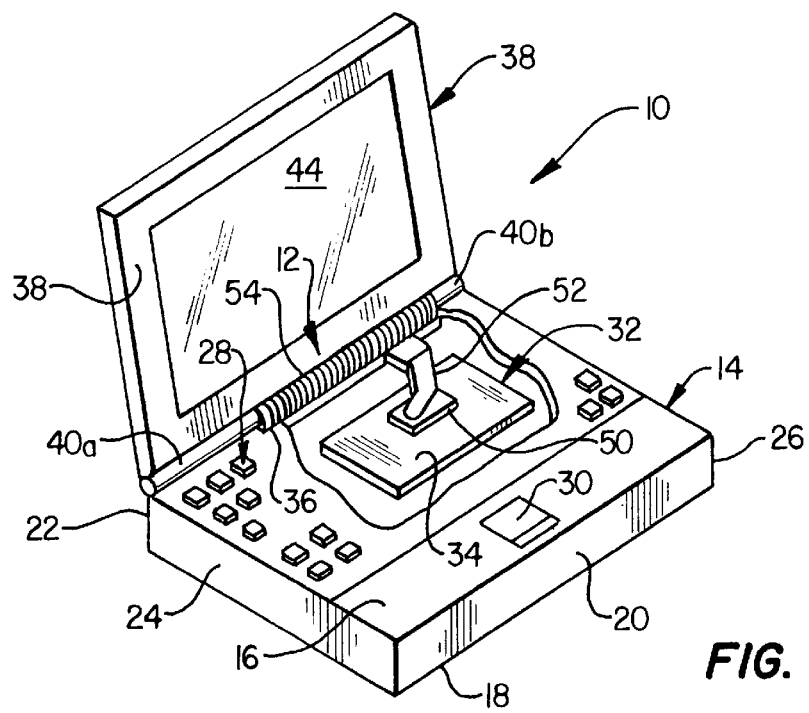
FIG. 1
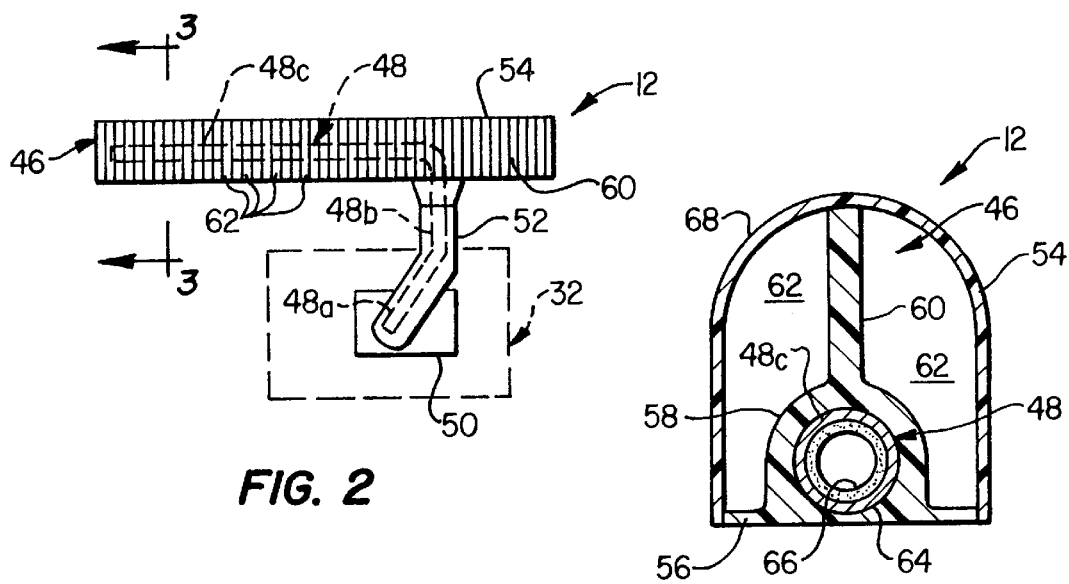
FIG. 2
FIG. 3

MOLDED HEAT EXCHANGER STRUCTURE FOR PORTABLE COMPUTER

BACKGROUND OF THE INVENTION

1. Field of the Invention

The present invention relates generally to apparatus for cooling heat generating electronic components, and, in a preferred embodiment thereof, more particularly relates to a heat pipe-based molded heat exchanger structure for use in conjunction with a heat generating electronic component, such as a processor, in a computer.

2. Description of Related Art

As small portable computers, such as the increasingly popular notebook computer, have become faster and more powerful their internally generated operating heat needing to be dissipated has correspondingly increased to the extent that adequate heat dissipation has become a major design concern in these more powerful compact computing devices.

The primary heat generating components in notebook computers, such as the processor, power supply, hard drive and the like, are typically disposed in the base housing portion of the computer to which the display screen-carrying lid housing portion is pivotally secured for movement relative thereto between open and closed positions. With the continuing trend toward higher power densities in electronic equipment, particularly in the case of microprocessor devices such as computers, temperature control becomes critical to successful system design.

Portable notebook computers, due to their combination of high operating heat generation and low volume, have proven to present particularly difficult design problems from an overall heat dissipation standpoint. Higher capacity batteries, higher bus speeds, integrated AC adapters, and greater expandability have combined to increase heat generation in notebook computers while at the same time their volume continues to shrink.

For electronic devices such as computers to operate efficiently they must be kept below certain specified operating temperatures. In the case of low powered devices, or in less temperature-sensitive devices, this may require little design effort. However, for higher powered electronic components it is sometimes necessary to provide a direct path for heat removal. This task becomes an integral part of the design process in working with the device. In these situations it is necessary to provide a thermal path from the interior of the device to the outside environment. The cooling path must have a low thermal resistance in order to efficiently transport heat from the source to the outside environment. The thermal resistance of the path is determined by the thermal conductivity of each element in the path and by the effective thermal conductivity of the interfaces between the elements.

Personal computers frequently employ two types of thermal paths. Most non-portable systems, and some notebook computers, use a forced convection path in which a fan forces moving air over components. Some notebook computers use a combination of natural heat convection and conduction. This is advantageous for notebook computers, as it eliminates the need for a fan. Fans cause problems in notebook computers due to cost, size limitations, reliability concerns, battery power consumption and audible noise.

On the other hand, the elimination of the fan also poses a problem. Without moving air removing heat from the system, it is often necessary to provide a continuous conductive path to the outside of the notebook computer. This poses a further problem since when the heat reaches the outside of the system it can come into contact with the user. If the heat is sufficiently concentrated this can cause uncomfortably hot spots on the surface of the notebook computer. There are human factors specifications which provide temperature limits for areas that the user may be able to contact, and these specification limits must not be exceeded.

In one previously proposed design incorporating a combination of heat conduction and natural conduction to dissipate heat from a processor board in a portable notebook computer, a cooling path from the processor board to the exterior of the computer housing was formed using a thermosyphoning heat pipe in conjunction with a cast magnesium secondary heat exchanger. The underside of the magnesium heat exchanger has a cast-in trough which receives the heat pipe which is held in place within the trough by a thermally conductive epoxy adhesive material which contacts roughly half of the perimeter of the heat pipe.

A first portion of the cast magnesium heat exchanger is suitably held against the heat generating processor board within the base housing of the computer, while a finned second portion of the heat exchanger extends into a slotted, outwardly projecting exterior touch guard portion assembled to the balance of the plastic computer housing, with an air gap being formed between the slotted touch guard structure and the surface of the finned heat exchanger portion. During operation of the computer, heat generated by the processor board is transferred to one end of the heat pipe via the first portion of the magnesium heat exchanger and transferred therefrom through the heat pipe to the finned heat dissipation portion of the heat exchanger for transfer therefrom to ambient air external to the computer housing.

While this previously proposed design adequately transfers processor heat from the interior of the computer to the outside of the computer, it has several disadvantages from both heat transfer and assembly standpoints. For example, the transfer of heat from the heat pipe to the outside air is impaired by several factors. Specifically, (1) only approximately half of the heat pipe perimeter is in contact with the epoxy material used to thermally communicate the heat pipe with the magnesium heat exchanger, (2) the epoxy material has a relatively low thermal conductivity compared to the heat pipe and the heat exchanger, and (3) the air gap between the magnesium heat exchanger and the slotted exterior housing portion undesirably acts as a thermal insulator impeding release of processor heat to the exterior of the computer.

Additionally, the fabrication and assembly process for the heat pipe/heat exchanger structure is a rather involved, labor intensive one which includes (1) casting the magnesium heat exchanger, (2) drilling and tapping the heat exchanger for mounting on the processor board, (3) bending the heat pipe to fit the shape of the trough in the underside of the heat exchanger, (4) epoxying the bent heat pipe into the trough by hand and allowing the epoxy to cure, (5) molding the slotted "touch guard" portion of the computer housing as part of the exterior plastics, (6) assembling the heat exchanger to the processor board, and (7) assembling the touch guard to the heat exchanger.

In addition to the above mentioned heat transfer impairments and fabricational complexity of this previously proposed heat pipe-based heat exchanger structure the use of a magnesium casting to form the heat sink portion of the structure poses a corrosion risk due to its assembly to other galvanicly active materials. It can thus be seen that, in a heat pipe-based heat exchanger of the general type described above, it would be desirable to eliminate or at least substantially reduce these problems, limitations and disadvantages.

SUMMARY OF THE INVENTION

In carrying out principles of the present invention, in accordance with a preferred embodiment thereof, a specially designed heat pipe-based heat exchanger assembly having a simplified construction and improved heat transfer characteristics is representatively incorporated into the base housing portion of a portable notebook computer and utilized to dissipate to ambient operating heat generated by a processor board disposed within the base housing.

From a broad perspective the heat exchanger assembly comprises a thermosyphoning heat pipe structure onto which a thermally conductive heat exchanger body, preferably of a graphite fiber-filled plastic material, is directly overmolded in a manner substantially encapsulating the heat pipe within the molded outer heat exchanger body.

In a preferred embodiment of the heat exchanger assembly the body portion thereof has (1) an externally finned heat dissipation section which encapsulates a longitudinal heat dissipation portion of the heat pipe and extends outwardly through an opening in the base housing; (2) a heat receiving portion disposed within the base housing in a spaced apart relationship with the heat dissipation section of the heat exchanger body, encapsulating a corresponding heat receiving longitudinal portion of the heat pipe, and thermally communicated with the processor board to receive operating heat therefrom; and (3) a heat transfer portion interconnecting the heat receiving and dissipating portions of the heat exchanger body and encapsulating a corresponding longitudinal heat transfer portion of the heat pipe.

According to another aspect of the invention, a layer of touch guard material may be positioned on the outer fin edge surfaces of the heat dissipating portion of the heat exchanger body, the touch guard material having a lower thermal conductivity than that of the heat exchanger body. Preferably, the touch guard material is a plastic material fabricated as an integral part of the plastic heat exchanger body using a double shot molding process. Alternatively, this touch guard structure could be a structure separate from that of the heat exchanger body and be provided as a separately applied coating or laminate.

BRIEF DESCRIPTION OF THE DRAWINGS

FIG. 1 is a simplified partially cut away perspective view of a representative notebook computer incorporating therein a specially designed heat pipe-based molded heat exchanger structure embodying principles of the present invention;

FIG. 2 is an enlarged scale simplified top plan view of the heat exchanger structure removed from the computer; and FIG. 3 is an enlarged scale cross-sectional view through the heat exchanger structure removed from the computer.

DETAILED DESCRIPTION

Perspectively illustrated in simplified, partially cut away form in FIG. 1 is a representative computer, illustratively a portable notebook computer 10, which incorporates therein a specially designed heat exchanger assembly 12 embodying principles of the present invention.

Computer 10 includes a rectangular base housing 14 having top and bottom sides 16 and 18, front and rear sides 20 and 22, and left and right ends 24 and 26. A keyboard assembly 28 is operatively mounted on a rear portion of the top side 16 in back of a pointing device such as the illustrated touch pad 30. Disposed within the interior of the base housing 14, beneath the keyboard 28, is a schematically depicted heat generating electronic structure, representatively a processor board 32 having a top side 34. For purposes later described herein, an opening 36 is formed through a rear portion of the base housing top side 16 and is elongated in a direction parallel to the rear side 22.

A rectangular lid housing 38 is pivotally secured to a rear top side portion of the base housing 14, by a generally cylindrical hinge structure 40 having axially separated left and right portions 40a and 40b, for pivotal movement relative to the base housing between open and closed positions. The lid housing 38 has, on its front or inner side 42, a display screen 44. In its upwardly pivoted open position shown in FIG. 1, the lid housing 38 is generally transverse to the base housing 14 and exposes the keyboard 28 and the display screen 44 to user view. In the downwardly pivoted closed position of the base housing 38 (not shown) the base housing extends across and covers the keyboard 28. Suitable latch means (not shown) are provided for releasably holding the lid housing 38 in its closed position.

Turning now to FIGS. 2 and 3, the heat exchanger assembly 12 includes a high thermal conductivity graphite fiber-filled plastic outer body 46 which is directly overmolded onto and substantially encapsulates a thermosyphoning heat pipe 48. Representatively, the outer body 46 is formed from XYDAR PXM 94078 graphite fiber-filled plastic material available from AMOCO Performance Products.

The nonmetallic outer body 46 has a generally rectangular heat receiving pad portion 50 which is disposed within the interior of the base housing 14 and is suitably secured to the top side 34 of the processor board 32, in conductive thermal communication therewith, to receive processor-generated operating heat. Also disposed within the interior of the base housing 14 is an angled heat transfer arm portion 52 of the plastic heat exchanger body 46. Arm portion 52 is connected at one end to the pad 50, and its other end is connected to an elongated, transversely finned heat dissipation portion 54 of the plastic heat exchanger body 46.

The elongated heat dissipation portion 54 laterally projects upwardly through the base housing top side opening 36, as shown in FIG. 1, and has a shape along its length similar to that of the spaced apart hinge structure portions 40a, 40b. Body portion 54, as best illustrated in FIG. 3, has along its length a relatively thin rectangular base section 56, an elongated spine section 58 laterally projecting upwardly from a central portion of the base section 56, an elongated upper side rib section 60 laterally projecting upwardly from the top side of the spine section 58, and a longitudinally spaced series of cooling fin portions 62 formed on the base, spine and rib sections 56,58 and 60. As illustrated, the fins 62 representatively have arcuate upper side edge portions.

Heat pipe 48 is of a generally conventional construction and, as best illustrated in FIG. 3, has a hollow tubular metal body 64 (preferably formed from copper) which is sealed at its opposite ends and at least partial vacuum formed within its interior. The interior of the heat pipe body 64 is lined with a suitable wicking material 66, and a small quantity of thermosyphoning liquid (such as water) is captively retained within the interior of the body 64. As illustrated in FIGS. 2 and 3, a longitudinal heat receiving portion 48a of the heat pipe 48 is encapsulated in an outer end portion of the heat transfer arm portion 52 of the outer plastic heat exchanger body 46; a longitudinal heat transfer portion 48b of the heat pipe 48 is encapsulated in the balance of the arm portion 52;

and a longitudinal heat dissipating portion 48c of the heat pipe 48 is encapsulated in the spine section 58 of the plastic heat exchanger body 46 as can be best seen in FIG. 3.

During operation of the computer 10, processor heat is conducted to the heat receiving heat pipe portion 48a via the plastic heat exchanger body pad 50. Via a thermosyphoning action within the heat pipe 48, the processor heat received by the heat pipe portion 48a is transferred sequentially through the heat pipe portions 48b and 48c to the finned heat dissipation portion 54 of the encapsulating plastic heat exchanger body 46 for convective dissipation therefrom to ambient air external to the computer base housing 14. Pad-received heat from the processor board 32 is also transferred to the heat dissipation portion 54 of the plastic heat exchanger body 46 via its heat transfer arm portion 52.

Depending on the amount of processor heat being received by the pad portion 50, and the maximum operating temperature of the heat dissipating outer body portion 54, a layer of plastic touch guard material 68 may be suitably disposed on the outer edges of the fins 62 as best illustrated in FIG. 3. If required, this touch guard structure is of a lower thermal conductivity plastic formulation and preferably fabricated as an integral part of the plastic heat exchanger body 46 using a double shot molding process. Alternatively, the touch guard structure could be a structure separate from that of the plastic heat exchanger body and be provided as a separately applied coating or laminate.

Compared to the previously proposed heat pipe/magnesium casting heat exchanger assembly generally described in a previous section of this application, the molded heat exchanger assembly 12 of the present invention provides a variety of performance and fabrication advantages. For example, the heat exchanger assembly is much easier to fabricate and incorporate into the computer 10 requiring only that (1) the heat pipe 48 be appropriately bent to accommodate the shape of the heat exchanger body 46;

(2) the graphite-filled plastic body 46 be overmolded onto the bent heat pipe 48, at the same time creating any necessary mounting holes in the pad portion 50 and forming the touch guard layer 54 (if needed); and (3) assembling the finished assembly 12 to the processor board 32. This represents a considerable reduction in the previously required number of fabrication, assembly and installation steps. Moreover, the previously required epoxy layer is eliminated, and the total heat exchanger assembly part count is reduced. Also, since the magnesium heat exchanger body is eliminated, the risk of magnesium corrosion is advantageously eliminated.

While the heat exchanger assembly 12 has been representatively illustrated as being incorporated in a notebook computer to dissipate operating heat from a processor portion thereof, it will be readily appreciated that the principles of this invention could also be advantageously utilized in conjunction with other types of electronic devices to dissipate operating heat from other types of heat-generating components therein.

The foregoing detailed description is to be clearly understood as being given by way of illustration and example only, the spirit and scope of the present invention being limited solely by the appended claims.

What is claimed is:

1. A heat exchanger assembly for use in dissipating operating heat from an electronic device, comprising:
    a thermosyphoning heat pipe structure; and
    a thermally conductive plastic-based material heat exchanger body molding having a heat dissipating section, a heat receiving section spaced apart from said heat dissipating section and positionable in a heat receiving relationship with a heat generating electronic device, and a heat transfer section interconnecting said heat receiving and heat dissipating sections,
    longitudinal portions of said thermosyphoning heat pipe structure being encapsulated within and in direct internal contact with said heat receiving, heat transfer and heat dissipating sections of said thermally conductive plastic-based material heat exchanger body molding,
    said plastic-based material having a first thermal conductivity,
    said heat dissipating section of said heat exchanger body having external cooling fins thereon with outer edge surfaces, and
    said heat exchanger assembly further comprising a plastic-based touch guard material coating disposed on said outer edge surfaces of said cooling fins and having a second thermal conductivity lower than said first thermal conductivity.

2. The heat exchanger assembly of claim 1 wherein said plastic-based material is a fiber-filled plastic material.

3. The heat exchanger assembly of claim 2 wherein said fiber-filled plastic material is a graphite fiber-filled plastic material.

4. The heat exchanger assembly of claim 1 wherein:
    said heat dissipating section has an elongated, externally finned configuration,
    said heat receiving section is spaced laterally apart from said heat dissipating section, and
    said heat transfer section extends generally transversely to said heat dissipating section.

5. An electronic device comprising:
    a housing having a heat generating electronic component herein; and
    a heat exchanger assembly operative to dissipate operating heat generated by said electronic component, said heat exchanger assembly including a thermosyphoning heat pipe structure and a thermally conductive plastic-based material heat exchanger body structure molding substantially encapsulating said thermosyphoning heat pipe structure and coating the exterior thereof,
    said heat exchanger body structure having a heat receiving section in thermal communication with said heat generating component, and a heat dissipating section exposed to the exterior of said housing,
    said thermally conductive heat exchanger body structure having a first thermal conductivity, and said heat dissipation section having an outer side surface portion on which a coating of touch guard material is formed, said touch guard material having a second thermal conductivity less than said first thermal conductivity.

6. The electronic device of claim 5 wherein said plastic-based material is a graphite fiber-filled plastic material.

7. The electronic device of claim 5 wherein:
    said device is a computer,
    said housing has an opening therein, and
    said heat dissipating section of said heat exchanger body structure molding extends outwardly through said opening.

8. The electronic device of claim 7 wherein said computer is a notebook computer, and said housing is a base housing portion of said notebook computer.

9. The electronic device of claim 8 wherein said base housing is pivotally connected to a lid housing by a hinge structure, and said opening is positioned at said hinge structure.

10. The electronic device of claim 7 wherein said heat generating electronic component is a processor board.

\* \* \* \* \*